(12) United States Patent
Wang et al.

(10) Patent No.: US 11,110,667 B2
(45) Date of Patent: Sep. 7, 2021

(54) FABRICATION OPTIMIZATION FOR COMPOSITE PARTS

(71) Applicant: The Boeing Company, Chicago, IL (US)

(72) Inventors: Michael Yee-Chih Wang, Seattle, WA (US); Jeffrey Lawrence Miller, Mukilteo, WA (US); Jonas Beuchert, Berlin (DE); Roger Erh Hsiang Chen, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 16/380,215

(22) Filed: Apr. 10, 2019

(65) Prior Publication Data

US 2020/0324494 A1 Oct. 15, 2020

(51) Int. Cl.
| G05B 19/18 | (2006.01) |
| B29C 70/38 | (2006.01) |
| B64F 5/10 | (2017.01) |
| G05B 13/02 | (2006.01) |
| G05B 19/408 | (2006.01) |
| G05B 19/414 | (2006.01) |

(52) U.S. Cl.
CPC .......... *B29C 70/38* (2013.01); *B64F 5/10* (2017.01); *G05B 13/027* (2013.01); *G05B 19/182* (2013.01); *G05B 19/4083* (2013.01); *G05B 19/414* (2013.01)

(58) Field of Classification Search
CPC ..... B29C 70/38; B29C 64/393; B29C 64/118; B64F 5/10; G05B 13/027; G05B 19/182; G05B 19/4083; G05B 19/414; G05B 19/4099; G06N 3/08; B33Y 10/00; B33Y 50/02
See application file for complete search history.

(56) References Cited

U.S. PATENT DOCUMENTS

| 5,111,531 A * | 5/1992 | Grayson ................ G06N 3/105 706/23 |
| 10,234,848 B2 | 3/2019 | Mehr et al. |
| 2010/0204815 A1* | 8/2010 | Murrish ............. G05B 19/4097 700/98 |

OTHER PUBLICATIONS

Zafer Gurdal, Brian F. Tatting, and K. Chauncey Wu, Tow-Placement Technology and Fabrication Issues for Laminated Composite Structures, 46th AIAA/ASME/ASCE/AHS/ASC Structures, Structural Dynamics & Materials Conference, Apr. 18-21, 2005 (Year: 2005).*

(Continued)

*Primary Examiner* — Christopher E. Everett
(74) *Attorney, Agent, or Firm* — Duft & Bornsen, PC

(57) ABSTRACT

Systems and methods are provided for facilitating fabrication of a composite part. An illustrative method includes loading a Numerical Control (NC) program that directs layup of tows by a fiber placement machine to create a laminate for curing into a composite part, identifying tow information recited in the NC program, applying inputs based on the tow information to a neural network that has been trained with measurements describing tow placement within other laminates that have been laid-up, and reporting likelihood of a fabrication discrepancy that is out of tolerance, based on an output of the neural network.

25 Claims, 12 Drawing Sheets

(56) References Cited

OTHER PUBLICATIONS

Groß, L., Herwig, A., Berg, D.C. et al. Production-based design of a hybrid load introduction element for thin-walled CFRP Structures. Prod. Eng. Res. Devel. 12, 113-120, Mar. 21, 2018 (Year: 2018).*
Automated Fiber Placement; Wikipedia; Feb. 11, 2019.
Neural Network; Wikipedia; Feb. 11, 2019.
Chen Mengjuan et al; Intelligent Inspection System Based on Infrared Vision for Automated Fiber Placement; Aug. 5, 2018.
European Search Report; Application EP20168736; dated Aug. 31, 2020.
J. Bruning et al; Machine Learning Approach for Optimization of Automated Fiber Placement Processes; Jan. 1 2017.
Schmidt Carsten et al; Deep Learning-based Classification of Production Defects in Automated-fiber-placement Processes; Mar. 21, 2019.

* cited by examiner

FABRICATION OPTIMIZATION FOR COMPOSITE PARTS

FIELD

The disclosure relates to the field of fabrication, and in particular, to fabrication of fiber reinforced composite parts.

BACKGROUND

Multi-layer laminates of constituent material (e.g., Carbon Fiber Reinforced Polymer (CFRP)) may be formed into any of a variety of shapes for curing into a composite part. To facilitate the fabrication of composite parts, a fiber placement machine (e.g., an Advanced Fiber Placement (AFP) machine or Automated Tape Layup (ATL) machine) may be utilized. For example, a fiber placement machine may lay up one or more layers of tows of constituent material that form a laminate which is then cured.

The operations of a fiber placement machine may be directed by a Numerical Control (NC) program that dictates movements of the fiber placement machine as tow layup continues. A fiber placement machine may dispense multiple tows at once onto a laminate in a single course. A course is a single "run" of a fiber placement machine head across the laminate. Because the fiber placement machine head comprises multiple lanes which each may dispose a tow, a fiber placement machine may initiate or terminate individual tows during a course in response to instructions from the NC program.

Designs for a composite part may dictate the number of layers within each region of the composite part, and may further dictate fiber orientations for each layer of the composite part. Because NC programs are based on designs but are not dictated by designs, countless different NC programs could be used to lay up a provided design. Each NC program may involve applying different combinations of courses and/or machine parameters in order to arrive at the parameters of a given design. Some NC programs may have increased desirability (e.g., faster fabrication time), while others may have decreased desirability (e.g., because they may create out-of-tolerance conditions). A priori, it is difficult to determine which NC programs are more beneficial than others from a manufacturing standpoint. Furthermore, it is infeasible to simply lay up a laminate according to each of numerous NC programs and then compare the results, because there are a limitless number of NC programs which could be used to design even a simple composite part. These difficulties are only amplified for designs that may change or evolve over time, as well as for composite parts that are substantially large, complex, and/or time consuming to manufacture (e.g., a wing of an aircraft).

Therefore, it would be desirable to have a method and apparatus that take into account at least some of the issues discussed above, as well as other possible issues.

SUMMARY

Embodiments described herein predictively identify similarities between new NC programs that have not been used to fabricate a composite part, and prior NC programs which have already been used to fabricate composite parts. Using measurements acquired during operation according to the prior NC programs, a likelihood of fabrication discrepancies relating to the proposed NC programs may be determined on a localized basis. The techniques described herein may utilize machine learning models, such as trained neural networks, to perform such operations.

One embodiment is a method for facilitating fabrication of a composite part. The method includes loading a Numerical Control (NC) program that directs layup of tows by a fiber placement machine to create a laminate for curing into a composite part, extracting tow information recited in the NC program, applying inputs based on the tow information to a neural network that has been trained with measurements describing tow placement within other laminates that have been laid-up, and reporting likelihood of a fabrication discrepancy that is out of tolerance, based on an output of the neural network for the NC program.

A further embodiment is a non-transitory computer readable medium embodying programmed instructions which, when executed by a processor, are operable for performing a method for facilitating fabrication of a composite part. The method includes loading a Numerical Control (NC) program that directs layup of tows by a fiber placement machine to create a laminate for curing into a composite part, extracting tow information recited in the NC program, applying inputs based on the tow information to a neural network that has been trained with measurements describing tow placement within other laminates that have been laid-up, and reporting likelihood of a fabrication discrepancy that is out of tolerance, based on an output of the neural network for the NC program.

A further embodiment is an apparatus for facilitating fabrication of a composite part, the apparatus comprises a memory storing a Numerical Control (NC) program that directs layup of tows by a fiber placement machine to create a laminate for curing into a composite part, and a controller that identifies tow information recited in the NC program, applies inputs based on the tow information to a neural network that has been trained with measurements describing tow placement within other laminates that have been laid-up, and reports a likelihood of a fabrication discrepancy that is out of tolerance, based on an output of the neural network.

A still further embodiment is a method for facilitating fabrication of a composite part. The method comprises laying up a laminate with a fiber placement machine, acquiring measurements of the laminate, the measurements indicating locations of out of tolerance conditions, training a neural network based upon the measurements, analyzing a Numerical Control (NC) program for laying up a new laminate, via the neural network, and generating a heat map indicating likelihoods of locations on the laminate exhibiting an out of tolerance condition, based on output from the neural network.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform or laminate. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
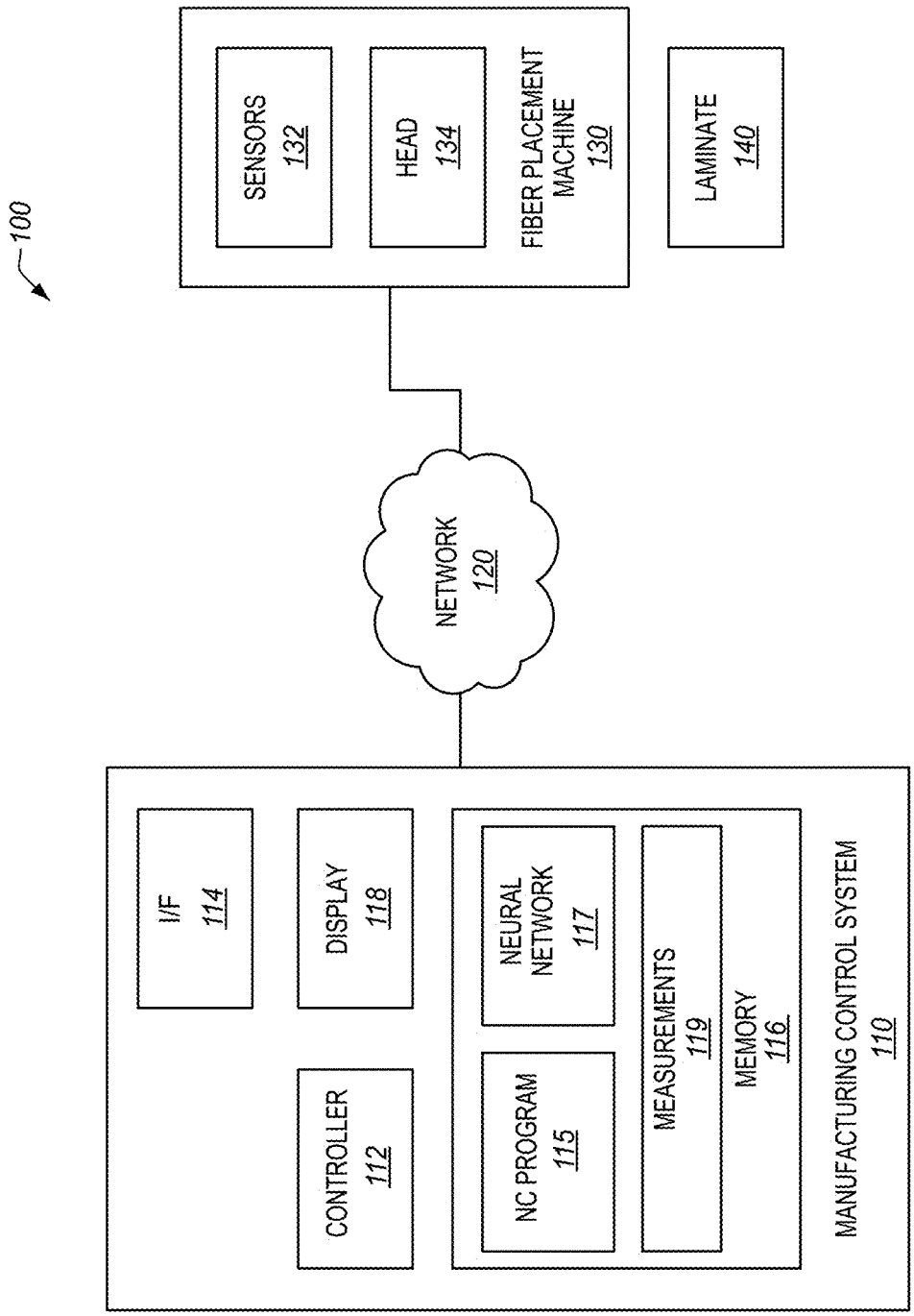
FIG. 1 illustrates a fabrication environment in an illustrative embodiment.

FIG. 1 is a block diagram of fabrication system 100 in an illustrative embodiment. Fabrication system 100 comprises any system, device, or component operable to generate and revise NC programs for directing the layup operations of a fiber placement machine. Fabrication system 100 has been enhanced to detect and report likelihoods of fabrication discrepancies that are out of tolerance found in NC programs.

In this embodiment, fabrication system 100 includes manufacturing control system 110, which communicates with fiber placement machine 130 (e.g., an ATL machine, AFP machine, etc.), via network 120 in order to facilitate layup of one or more laminates 140. For example, manufacturing control system 110 may provide NC programs to fiber placement machine 130 in order to direct the operations of fiber placement machine 130. Each NC program 115 includes instructions for directing fiber placement machine 130. These instructions may indicate, for example, locations for head 134 to initiate courses of tows, a feed rate/layup speed, a temperature for a heater at the fiber placement machine 130, locations at which to initiate or cut tows within a given course, etc. A tow is a single contiguous piece of prepreg tape, while a course is a group of contiguous pieces of prepreg tape that are applied via a single movement of head 134 of fiber placement machine 130.

Fiber placement machine 130 may lay up laminate 140 in accordance with instructions in received NC programs, and may further operate sensors 132 (e.g., laser sensors, actuator sensors, cameras, IR sensors etc.) in order to acquire measurements of laminate 140 during and/or after layup. The measurements may indicate locations of tow/tape placement at the laminate 140. These measurements may also indicate how tows are physically located with respect to each other within the laminate as laid-up, whether the tows are separated by gaps or include overlapping regions ("laps"), the location of twisted tows or untacked tows, and other pieces of information. These measurements may be forwarded to manufacturing control system 110 and stored as measurements 119 for evaluation by neural network 117. For large composite parts such as the wings of an aircraft, a single laminate may yield millions of measurements (e.g., eight million measurements) which may be used as input for evaluating an NC program.

Manufacturing control system includes controller 112, interface (I/F) 114, memory 116, and display 118. Controller 112 manages the operations of manufacturing control system 110 based on instructions stored in memory 116. For example, controller 112 may modify, train, or operate neural network 117 stored in memory 116, in order to evaluate NC programs stored in memory 116. Controller 112 may also operate I/F 114 in order to provide NC programs to fiber placement machine 130. Controller 112 may be implemented, for example, as custom circuitry, as a hardware processor executing programmed instructions, or some combination thereof. I/F 114 may comprise an ethernet interface, a Universal Serial Bus (USB) interface, a Serial Attached SCSI (SAS) interface, a wireless interface compatible with IEEE 802.11 wireless protocols, etc.

Neural network 117 comprises a combination of layers that each comprise nodes, and connection weights that link nodes in different layers. Neural network 117 may be implemented, for example, as a shallow network having between one and three hidden layers, and up to twenty neurons per layer. For example, neural network 117 may comprise a single-layer network with ten neurons. While only one neural network 117 is shown, memory 116 may store a variety of neural networks that have each been trained for a different model of fiber placement machine 130, a different type of composite part (e.g., wings vs fuselages of an aircraft), etc.

Laminate 140 comprises a series of uncured tows of prepreg tape that are laid-up in courses. As used herein, the combination of tows that are physically laid for a single layer is referred to as a "ply sequence," while a contiguous combination of tows within a single layer is referred to as a "ply shape." A ply sequence may, for example, include one ply shape or multiple ply shapes.

Illustrative details of the operation of fabrication system 100 will be discussed with regard to FIGS. 2A-2B. Assume, for this embodiment, that neural network 117 is presently untrained, and that a designer of laminate 140 intends to train the neural network 117 in order to evaluate NC programs for laying up laminate 140.

Figure 2A:
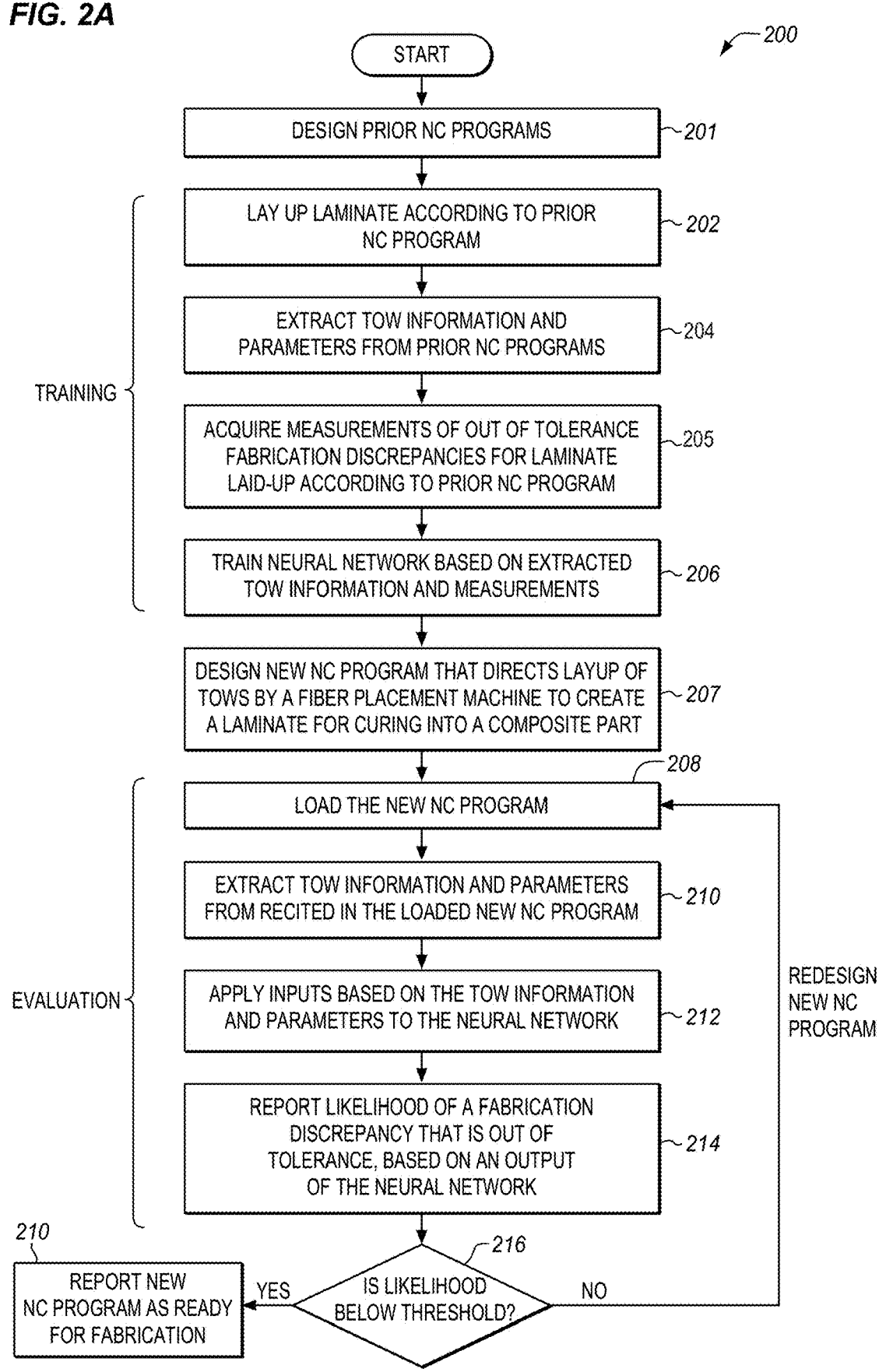
FIGS. 2A-2B are flowcharts illustrating a method for predicting fabrication discrepancies for NC programs used by a fabrication environment in an illustrative embodiment.

FIG. 2A is a flowchart illustrating a method 200 for predicting fabrication discrepancies that are out of tolerance for NC programs used by a fabrication environment in an illustrative embodiment. The steps of method 200 are described with reference to fabrication system 100 of FIG. 1, but those skilled in the art will appreciate that method 200 may be performed in other systems. The steps of the flowcharts described herein are not all inclusive and may include other steps not shown. The steps described herein may also be performed in an alternative order.

Method 200 is divided into phases of training and evaluation. In the training phase, neural network 117 is trained based on measurements 119 for one or more laminates (and/or resulting composite parts) that have already been fabricated according to known NC programs, in order to enable the predictive capabilities of neural network 117. The training utilizes the known NC programs as input, and utilizes the measurements in order to validate its output. In the evaluation phase, the trained version of neural network 117 is utilized to evaluate one or more NC programs. Thus, in many embodiments the training phase is performed only once, or periodically (e.g., at known intervals in time, each time a new laminate is measured, etc.), while the evaluation phase is performed multiple times after training has been completed.

Steps 201-206 represent the training phase. In step 201, a technician designs a prior NC program. In step 202, fiber placement machine 130 is operated according to one or more prior NC programs to lay up a laminate. The prior NC programs may each comprise an NC program for fabricating a laminate. However, in many embodiments, it may be preferable for the prior NC program to direct the same robot, or to be used for fabricating the same design of laminate, as new NC programs which will later be evaluated by neural network 117.

In step 204, tow information and parameters from the prior NC program(s) are extracted. In step 205, controller 112 acquires measurements of out-of-tolerance fabrication discrepancies for the laminate that was laid-up according to the prior NC program. In one embodiment, the measurements are pre-processed, and indicate the location and type of fabrication discrepancies that are out of tolerance (e.g., based on their size and/or degree) as detected at the laminate, and may further report a period of time spent laying up the laminate, and an amount of conformance of the laminate with design parameters.

Conformance with design parameters is understood to vary, depending on the NC program used. For example, a design may indicate that a region should be filled with tows of prepreg tape having a predefined fiber orientation. However, because the region may have a width that is not evenly divisible by the width of the tows, a designer of the NC program may have to choose between slightly overfilling or underfilling the region with tows. This either results in gaps within the region (e.g., at the border of the region), results in the tows extending beyond the boundaries of the region, or some combination thereof.

The measurements may also include the results of inspection processes performed on the resulting composite part, such as Non-Destructive Imaging (NDI) techniques performed via laser, camera, infrared, or ultrasonic inspection. These results may be reported on a location-by-location basis to indicate locations where fabrication discrepancies are located. Controller 112 may further correlate the received measurements with instructions in the NC program that was used to design the laminate. For example, controller 112 may determine that an instruction in the NC program is directed to laying up a location at the laminate, and may then correlate measurements at the location with the instruction in the NC program. The measurements may also indicate the presence or absence of fabrication discrepancies that are out of tolerance (e.g., by applying a binary flag indicating the existence or nonexistence of an out of tolerance condition at each of multiple locations). Parameters within an NC program that may be analyzed include a tool path center line, positions of individual starts/stops, a feed rate, heater settings, and others.

In step 206, controller 112 trains the neural network 117 based on the extracted tow information and measurements (e.g., based on training data that includes the measurements and the prior NC program). Training the neural network comprises adjusting weights between nodes in the neural network based on the measurements. For example, inputs to the neural network 117 may include, for each location at the laminate: a geometry or curvature of the laminate, a distance from current location to an end of a tow, a number of layers at the location, a fiber angle within a tow, a temperature of a heater disposed at the fiber placement machine, a feed rate or layup speed, placement of tows within a course relative to each other, placement of courses within a layer, and other input that may be used to predict the likelihood of occurrence of gaps, laps, folds, twists, and/or wrinkles. That is, neural network 117 may be operated to generate results for a first location using a first set of inputs tied to the first location, and then may be operated to generate additional results for a second location using a second set of inputs, and so on. In environments wherein a large number of measurements (e.g., thousands or more) are acquired per laminate, the neural network 117 may be trained with measurements for a small number of laminates (e.g., one to four laminates) having a large number of measured locations. In further embodiments, the neural network may be trained with data from a large number of laminates (e.g., using a fraction of measurements from each of the laminates).

During training of neural network 117, outputs of the neural network (e.g., in the form of an estimated percentage likelihood of a fabrication discrepancy that is out of tolerance, at each of multiple locations) may be compared to known locations of fabrication discrepancies found in the training data. If the outputs inaccurately predict locations of fabrication discrepancies, connection weights between nodes in different layers of the neural network 117 are adjusted. For example, inaccurate predictions made by the neural network may be associated with a high cost as determined by a cost function, resulting in adjustment of connection weights during training. Outputs generated by the neural network may include, for each of multiple locations (e.g., points evenly spaced along a grid across a surface of the laminate), a likelihood of fabrication discrepancies such as gaps between tows greater than a predetermined size indicative of an out-of-tolerance condition, gaps between courses greater than a predetermined size, laps across tows greater than a predetermined size (e.g., laps of any size), laps across courses greater than a predetermined size (e.g., laps of any size), delays in fabrication speed/layup speed, wrinkles in tows, twists in tows, untacked tows, and a fill ratio below a predetermined amount. These various parameters may also be aggregated into a single likelihood value, if desired.

After training has been completed, neural network 117 may be validated to ensure that it provides accurate output indicating likelihood of fabrication discrepancies. This may be accomplished by cross validation techniques. For example, neural network 117 may be operated to make predictions for an NC program that was not included in the training data. Predictions made by neural network 117 may be compared to the actual results of layup operations performed according to the NC program. By statistically determining an accuracy of the predictions on a location-by-location basis, the neural network 117 may be validated. If the neural network 117 does not pass validation, it may be retrained by performing steps 204-206 again for additional training data.

Upon completion of training for neural network 117, neural network 117 may be used to evaluate new NC programs, and without the need to lay up new laminates according to the new NC programs. Thus, method 200 transitions from the training phase to the evaluation phase. During the evaluation phase, one or more new NC programs are evaluated using the neural network 117, in order to predict the location of fabrication discrepancies that are out of tolerance and that would occur if the new NC programs were utilized to lay up a composite part. The parameters used to define each out of tolerance condition may be varied. For example, selecting large parameter values for out of tolerance conditions may have an effect on desired properties of a final composite part, while selecting small parameter values for out of tolerance may increase production time have other effects. The designer proceeds to generate at least one new NC program for evaluation. The new NC program may, for example, be an NC program to lay up a laminate according to the same design as the prior NC program, and may be intended for use by the same fiber placement machine as the one that was used to lay up a laminate according to the prior NC program.

In step 207, a new NC program is designed that directs layup of tows by a fiber placement machine to create a laminate for curing into a composite part. In step 208, controller 112 loads the new NC program. The new NC program directs layup of tows by a fiber placement machine to create a laminate for curing into a composite part. The new NC program may for example be intended to design a similar composite part, or the same composite part as was used for the prior NC program. In step 210, controller 112 extracts tow information (e.g., operating parameters for head 134 that relate to or that facilitate the dispensing of tows) and parameters from the new NC program that was loaded. This may comprise identifying sets of instructions dedicated to each course within the new NC program, and determining inputs for the neural network 117 based on these sets of instructions. For example, the instructions may be used to calculate inputs to the neural network 117 described above with respect to step 206.

In step 212, controller 112 applies inputs from the new NC program to the neural network 117 (e.g., based on tow information and parameters). As discussed above, neural network 117 has already been trained based on measurements relating to a prior NC program describing tow placement and/or locations of fabrication discrepancies that are out of tolerance within one or more other laminates that have already been laid-up. Neural network 117 therefore determines a likelihood of a fabrication discrepancy that is out of tolerance at locations indicated in the new NC program, based on instructions or other information in the new NC program used as input. For example, the neural network may generate location-specific results for the new NC program being evaluated. The locations being analyzed may be evenly distributed across a grid, clustered around a predefined region of interest, and spaced according to a desired level of resolution.

With output from the neural network 117 determined on a location-by-location basis, the likelihood of fabrication discrepancies is known. Thus, step 214 comprises reporting one or more likelihoods of fabrication discrepancies, based on the output of the neural network 117. For example, the likelihoods may be provided in a textual format (e.g., a list of likelihoods and locations), a graphical format (e.g., a heatmap of the laminate), etc. This data may be considered in an iterative loop wherein new NC programs are created and evaluated. If the likelihood is below a threshold amount (e.g., five percent) (step 216), then controller 112 reports the new NC program as ready for fabrication (step 218). Alternatively, if the likelihood is above the threshold, then the new NC program is redesigned, and processing proceeds to step 208.

Method 200 provides a technical benefit over prior systems and techniques, because it enables output from various NC programs (intended for laying up the same design of laminate) to be compared in terms of their manufacturability. This increases an ability of designers to rapidly evaluate NC programs for laying up designs, without the need to fabricate a new laminate for each NC program being considered.

Figure 2B:
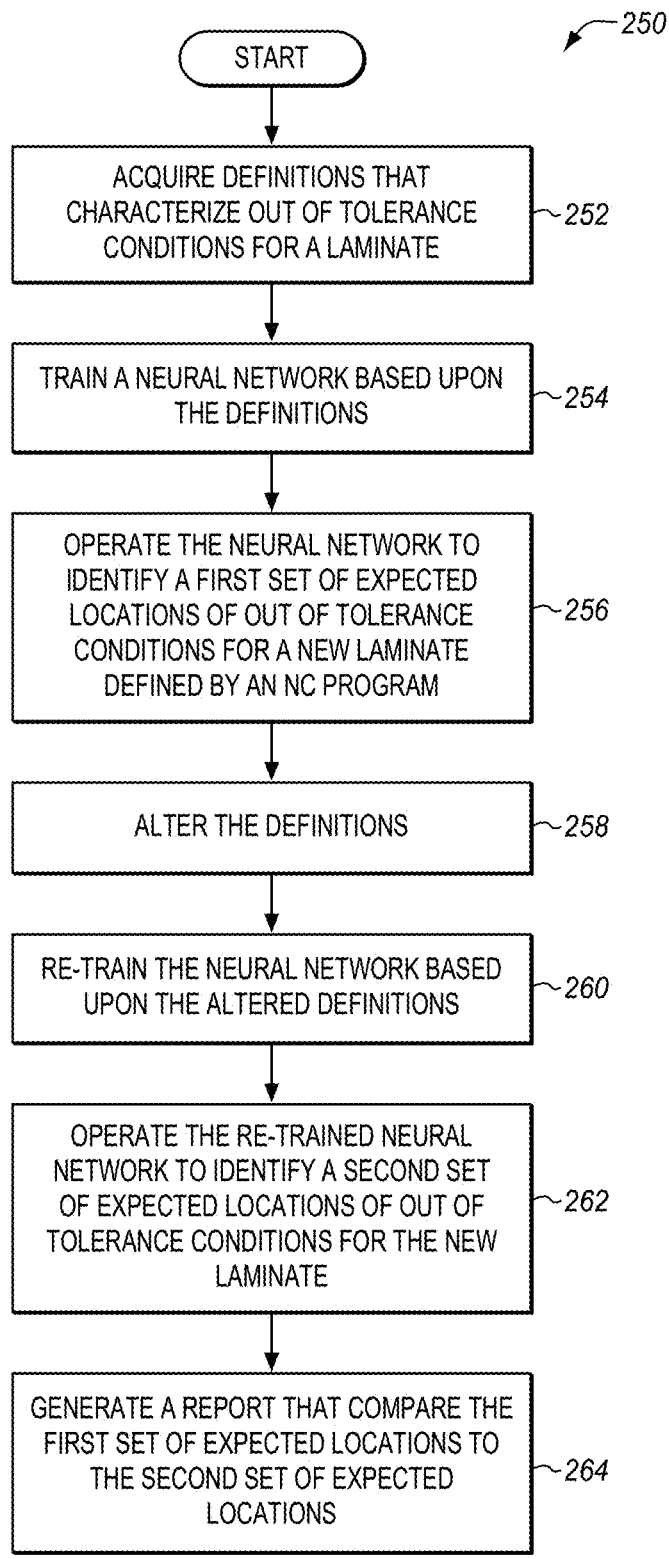

FIG. 2B is a flowchart illustrating a method 250 for predicting fabrication discrepancies that are out of tolerance in an illustrative embodiment. Method 250 differs from method 200 in that method 250 involves an operator adjusting tolerance conditions, and determining the likelihood of out of tolerance fabrication discrepancies based on those tolerance conditions. In this manner, a designer may see the effect of tightening or loosening tolerances on the design process. This gives a designer more freedom, and may be implemented as part of an iterative design process.

According to method 250, in step 252 controller 112 acquires definitions that characterize out of tolerance conditions for a laminate. For example, the definitions may indicate a shape and size of each category of out of tolerance condition (e.g., twists, bends, laps, gaps), or may indicate which measurements are indicative of out of tolerance conditions.

In step 254, controller 112 trains the neural network 117 based upon the definitions. For example, the neural network 117 may be trained based on the definitions as applied to measurements of a laminate that has already been laid-up. In step 256, controller 112 operates the neural network 117 to identify a first set of expected locations of out of tolerance conditions for a new laminate defined by a Numerical Control (NC) program. At this time, a report indicating the first set of expected locations may be provided to an engineer for review.

The engineer may be curious regarding how changed tolerance definitions may change the number, type of, and location of expected out of tolerance conditions. Thus, step 258 comprises controller 112 altering the definitions, and step 260 comprises re-training the neural network based upon the altered definitions. Controller 112 operates the re-trained neural network to identify a second set of expected locations of out of tolerance conditions for the new laminate in step 262, and in step 264 controller 112 generates a report that compares the first set of expected locations to the second set of expected locations. This report may be provided to the engineer in order to provide design insights and feedback. The report may also be provided as a heat map.

Figure 2C:
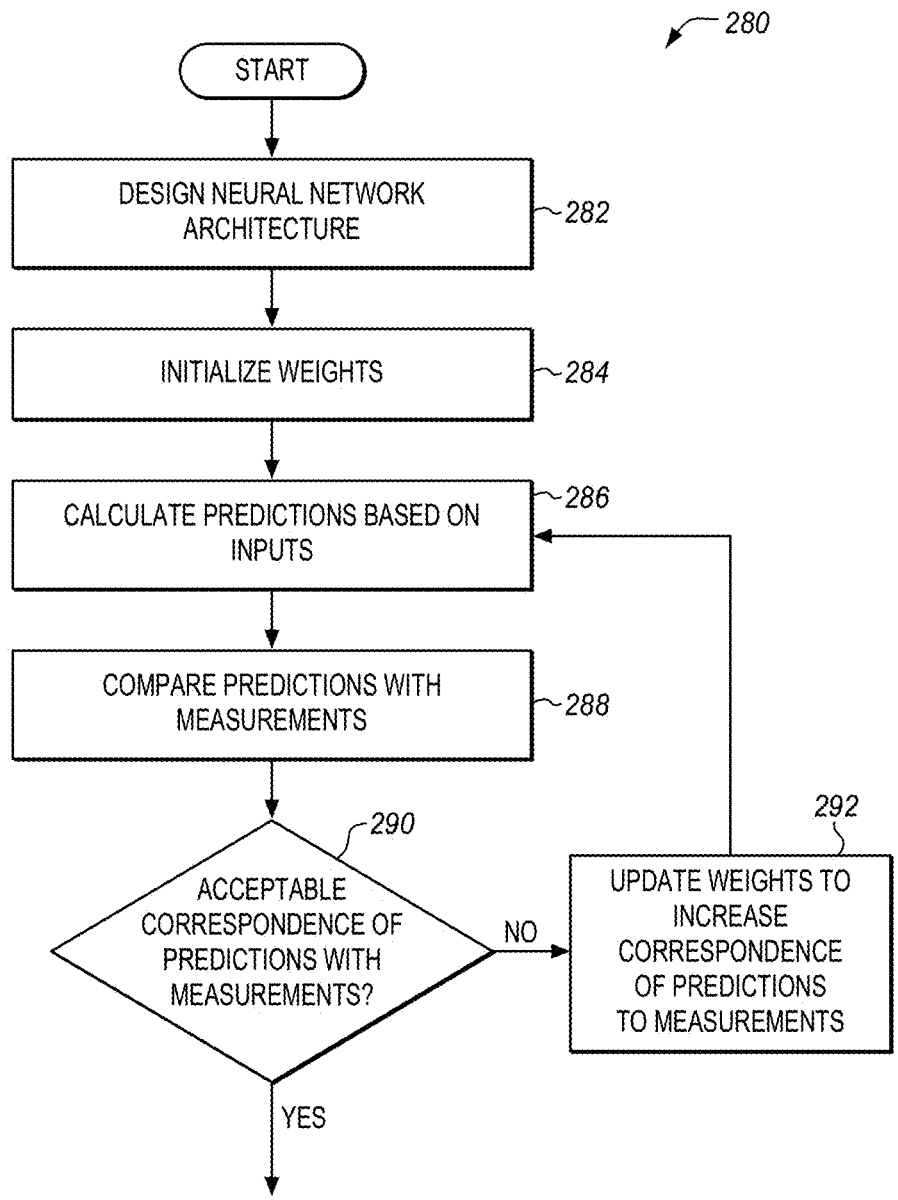
FIG. 2C is a flowchart illustrating training of a neural network in an illustrative embodiment.

FIG. 2C illustrates a method 280 of training a neural network in an illustrative embodiment. FIG. 2C includes designing a neural network architecture (e.g., a number of layers, a number of nodes in each layer, and connections between nodes in different layers) in step 282, initializing weights for the connections between nodes in step 284, calculating predictions based upon inputs in step 286, and comparing predictions with measurements in step 288. The method further includes determining whether an acceptable correspondence of predictions with measurements exists, in step 290. If an acceptable correspondence exists, the training may be completed. Alternatively, if the level of correspondence is not acceptable, then weights are updated to increase correspondence of predictions to measurements in step 292.

Figure 5:
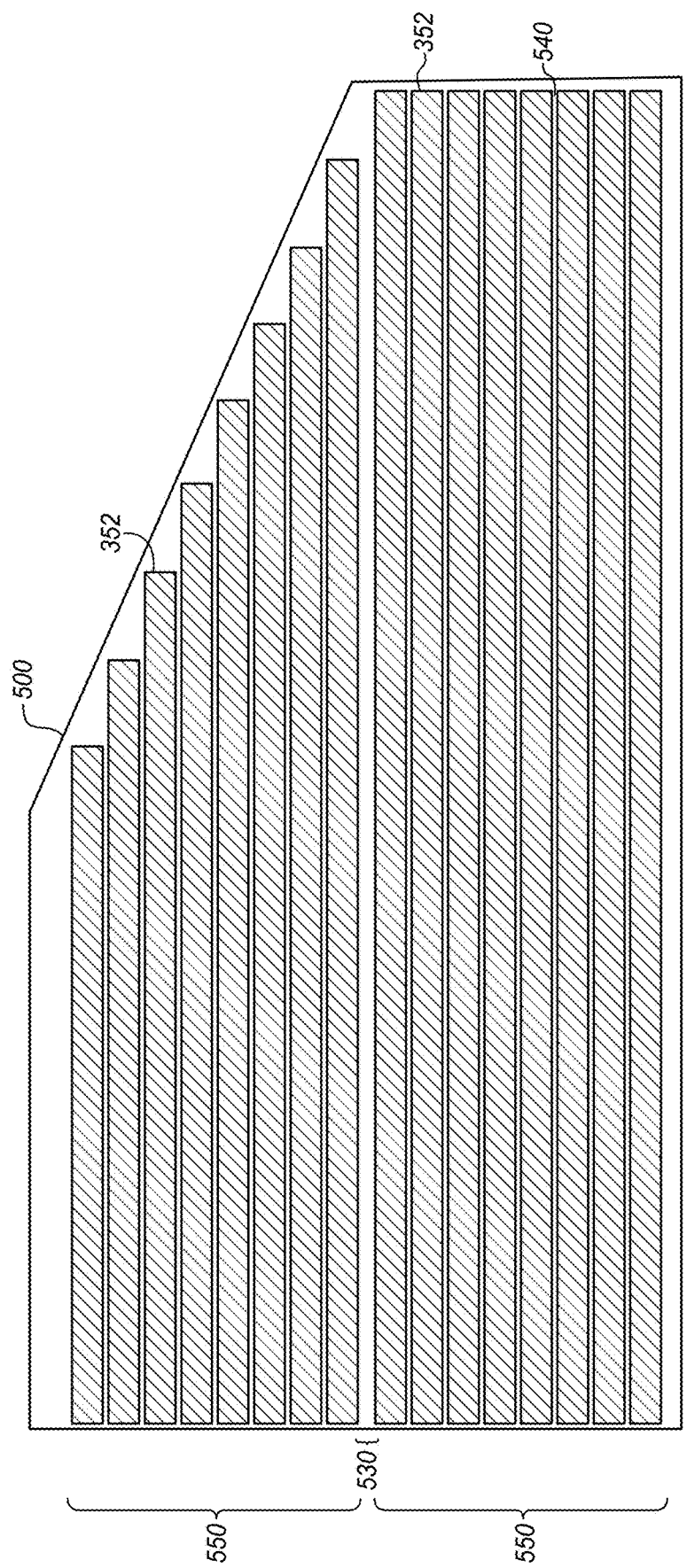
FIGS. 5-6 illustrate two different laminates laid up according to two different NC programs in illustrative embodiments.
Figure 6:
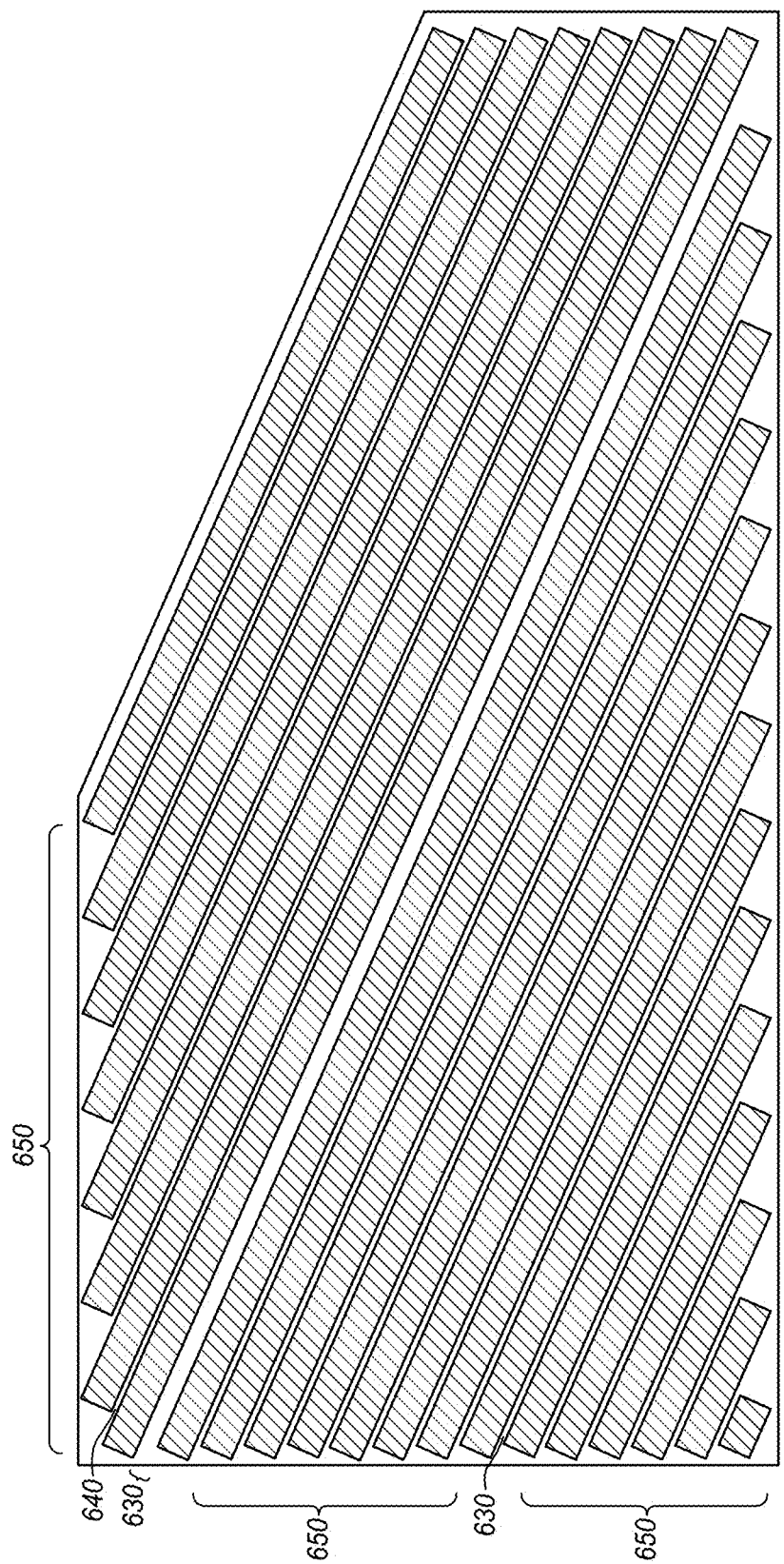
Figure 7:
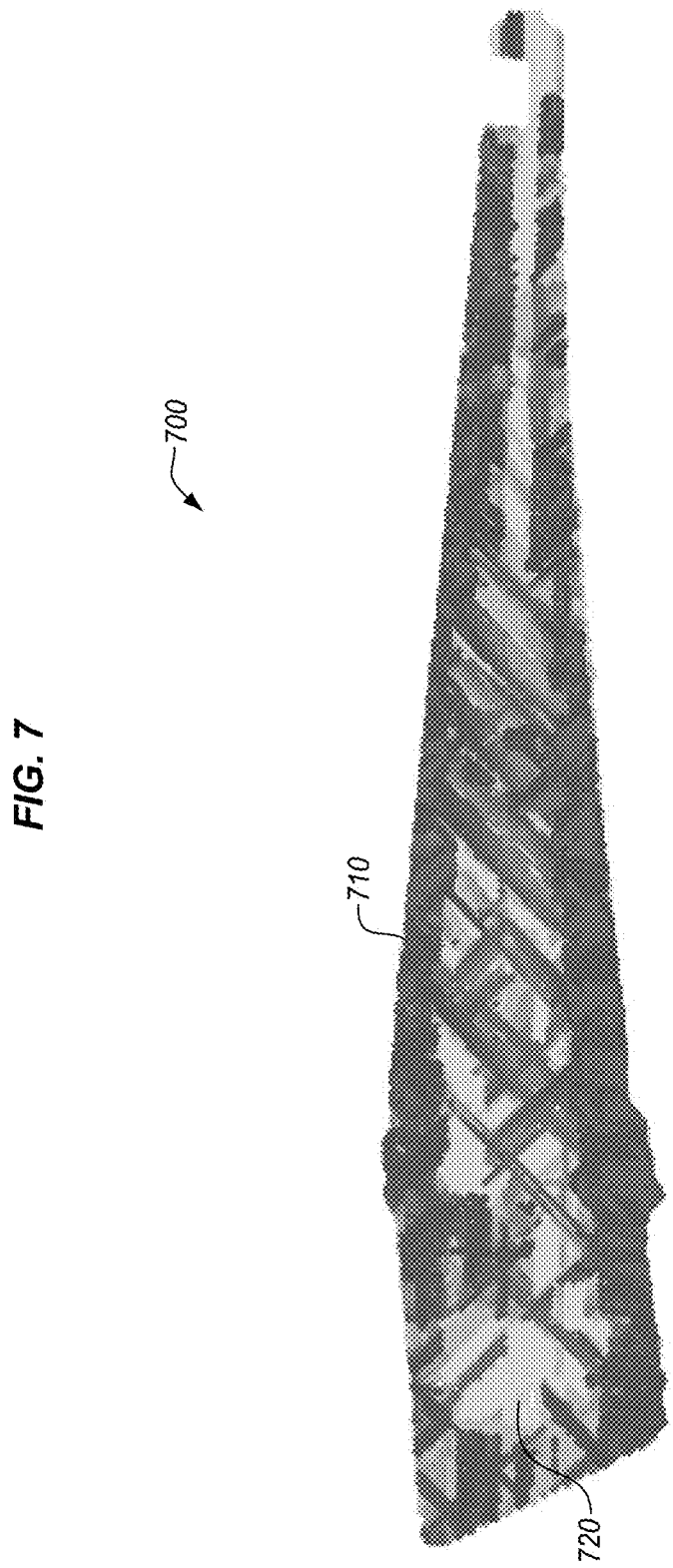
FIG. 7 is a heat map indicating a likelihood of fabrication discrepancies at different locations in an illustrative embodiment.
Figure 8:
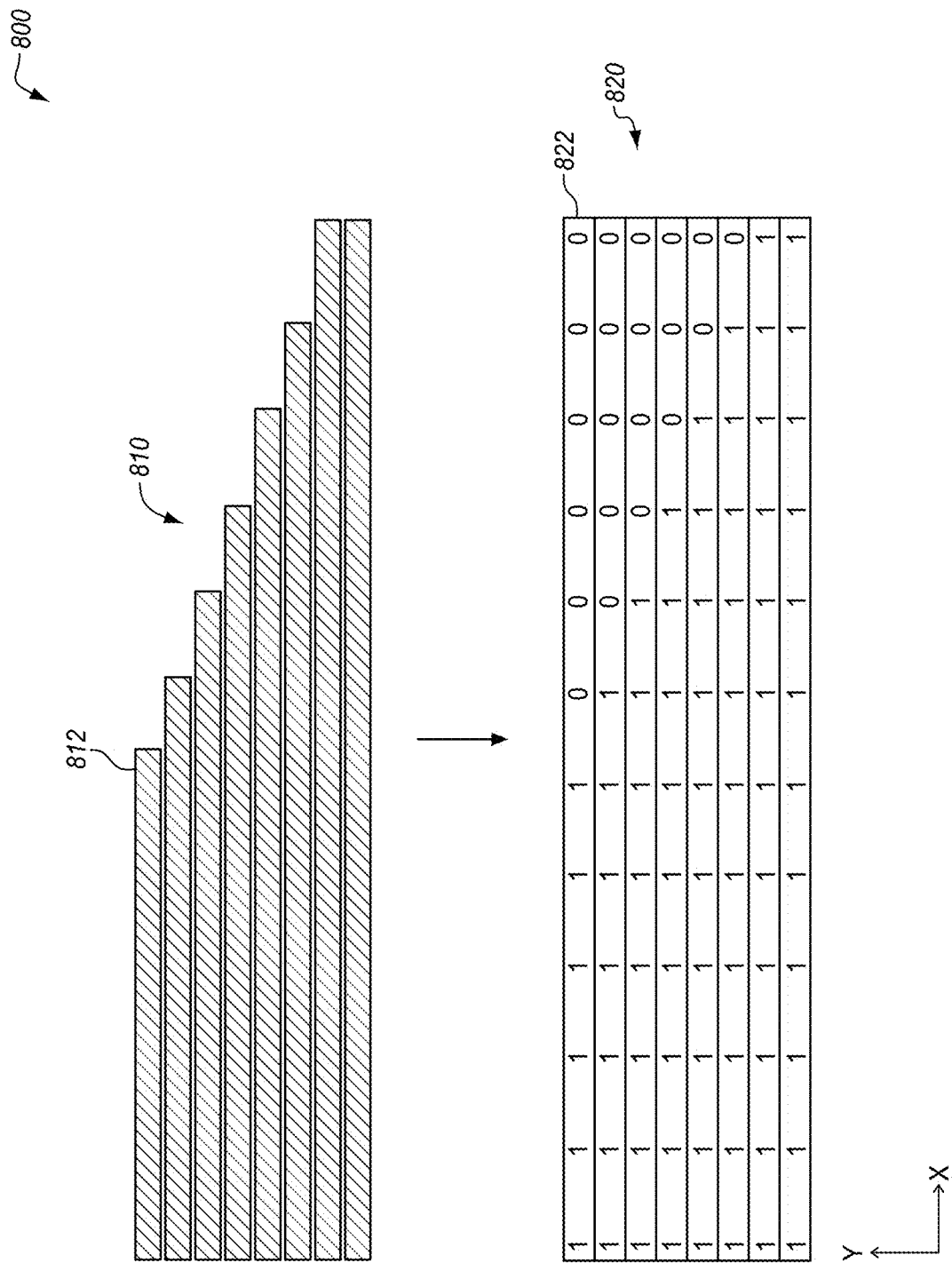
FIG. 8 illustrates conversions of a course into a binary image in an illustrative embodiment.

With a discussion provided above relating to the methods of evaluation for NC programs, FIGS. 3-6 depict fabrication of laminates via NC programs, and FIGS. 7-8 illustrate various additional features of a system that evaluates NC programs.

Figure 3:
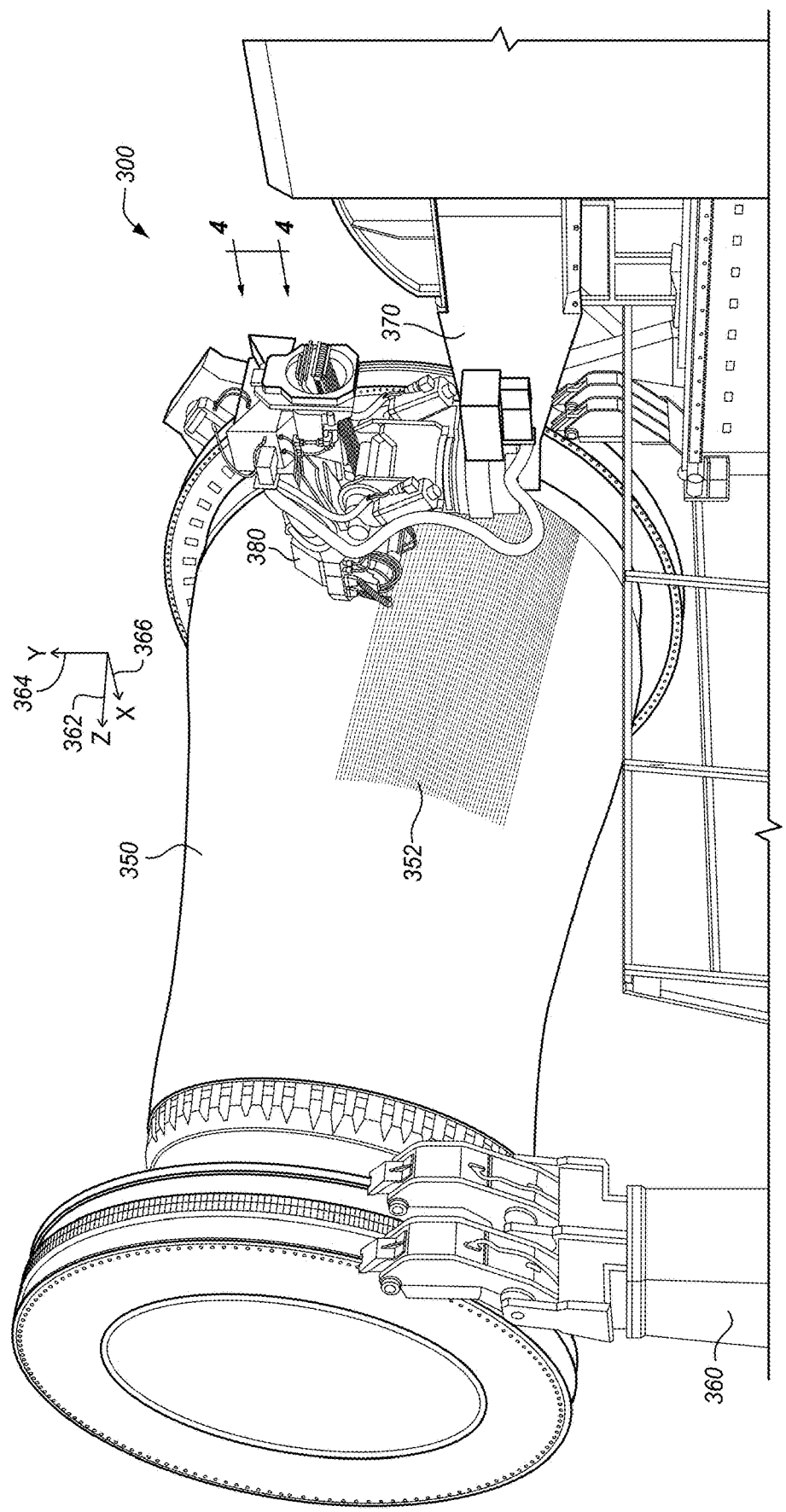
FIG. 3 is a perspective view of a fiber placement machine in an illustrative embodiment.

FIG. 3 is a diagram illustrating an AFP machine 300 that is mounted to a support 370 in an illustrative embodiment. AFP machine 300 comprises any system or device capable of laying up tows 352 of constituent material for curing into a composite part. AFP machine 300 includes head 380, which dispenses tows 352 of curable constituent material (e.g., CFRP) during layup (e.g., concurrently). Tows 352 are laid-up to form laminate 350, which comprises one or more layers of material that will be cured into a single monolithic composite part. In this embodiment, laminate 350 comprises a fuselage section for an aircraft, and is held in place by rotational holder 360. A sensor 390 measures the laminate as the laminate is laid-up, and may utilize any of the sensing technologies discussed above. Sensor 390 may acquire measurements (i.e., for the training data discussed above).

As AFP machine 300 operates to lay up tows 352 onto laminate 350, AFP machine 300 may move directly towards/away from laminate 350 along axis X 366, vertically upwards/downwards along axis Y 364, and/or laterally along axis Z 362. Laminate 350 may also be rotated about its central axis and/or moved axially relative to AFP machine 300. As used herein, when AFP machine 300 lays up multiple tows 352 concurrently during a single "sweep" of head 380, those tows 352 are collectively referred to as a single "course." A set of non-overlapping courses that are applied consecutively may be referred to as a layer. As layers are added to laminate 350, the strength of the resulting composite part is beneficially enhanced.

Laying up material for a laminate 350 that is large, such as a section of fuselage is a time-consuming and complex process. In order to ensure that tows 352 are laid-up quickly and efficiently, the operations of AFP machine 300 are controlled by an NC program. In one embodiment, the NC program provides instructions on a course-by-course basis for aligning/repositioning the AFP machine 300, moving head 380, and laying up tows 352 onto laminate 350. In this manner, by performing the instructions in the NC program, AFP machine 300 fabricates a laminate for curing into a composite part.

Figure 4:
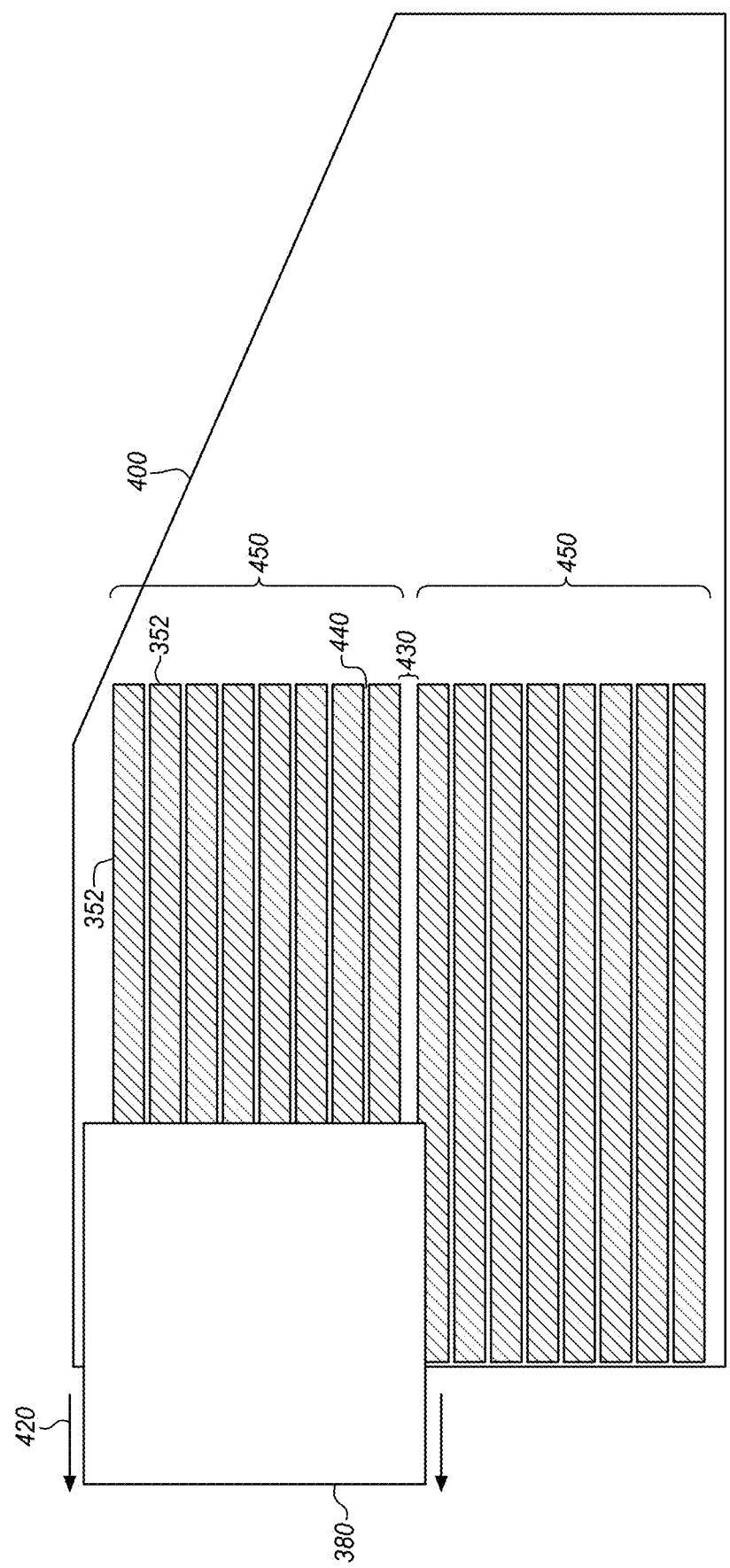
FIG. 4 is a top view of multiple courses laid-up by a fiber placement machine in an illustrative embodiment.

FIG. 4 is a top view of multiple courses 450 laid-up by a fiber placement machine in an illustrative embodiment, and corresponds with view arrows 4 of FIG. 3. As shown in FIG. 4, head 380 lays up courses 450 onto laminate 400 as it proceeds in direction 420. Each course 450 includes multiple tows 352. Gaps 440 exist between tows 352 within a single course, and gaps 430 exist between courses. If gaps 440 or gaps 430 exceed a predefined limit, a fabrication discrepancy that is out of tolerance may exist at the laminate. Furthermore, if the courses 450 do not fully occupy (or if they over-occupy) a desired region indicated in the design for placing tows 352, then a fabrication discrepancy may also exist. If gaps exist between adjacent edges of a region and the tows 352, then an out of tolerance condition may exist.

FIGS. 5-6 illustrate two different laminates laid up according to two different NC programs in illustrative embodiments. As shown in FIG. 5, laminate 500 exhibits gaps 530 between courses 550, and gaps 540 between tows 352 within a course. Meanwhile, laminate 600 exhibits a different combination of gaps 630 and gaps 640 for courses 650 which are laid-up in a different arrangement.

FIG. 7 is a heat map 700 indicating a likelihood of fabrication discrepancies at different locations in an illustrative embodiment. Heat map 700 has a shape corresponding with a shape of the laminate that it represents. Heat map 700 may be generated by applying inputs to neural network 117 for each of a variety of locations at a laminate that will be cured into an aircraft wing, and color coding indicating a likelihood of a fabrication discrepancy at each location. In this embodiment, heat map 700 includes regions 710 where fabrication discrepancies that are out of tolerance are more likely, and regions 720 where fabrication errors are less likely.

FIG. 8 is a drawing 800 that illustrates conversions of a course 810 into a binary image 820 in an illustrative embodiment. Binary image 820 may be generated for each course, such that each row (or column) represents a separate lane at the course, and data within these rows (or columns) indicate where tows start and stop within the lanes. As shown in FIG. 8, individual tows 812 extend different amounts along the X direction. Each row 822 of binary image 820 uses a "1" to indicate if a tow is present, and a "0" to indicate is a tow is absent for a specific unit of length (e.g., an inch, centimeter, etc.). Thus, in one embodiment, each course is represented as a binary image having a predefined width equal to the maximum number of tows in a course. Within the binary image, one pixel row corresponds with each tow. The binary image may be reshaped into a vector and used as input for a neural network in the form of a pattern recognition network, and additional input parameters can be appended to this vector. In this manner, controller 112 may operate the pattern recognition network based on binary image 820 to predict likelihoods of gaps that are out of tolerance between courses and also between tows within courses.

Figure 9:
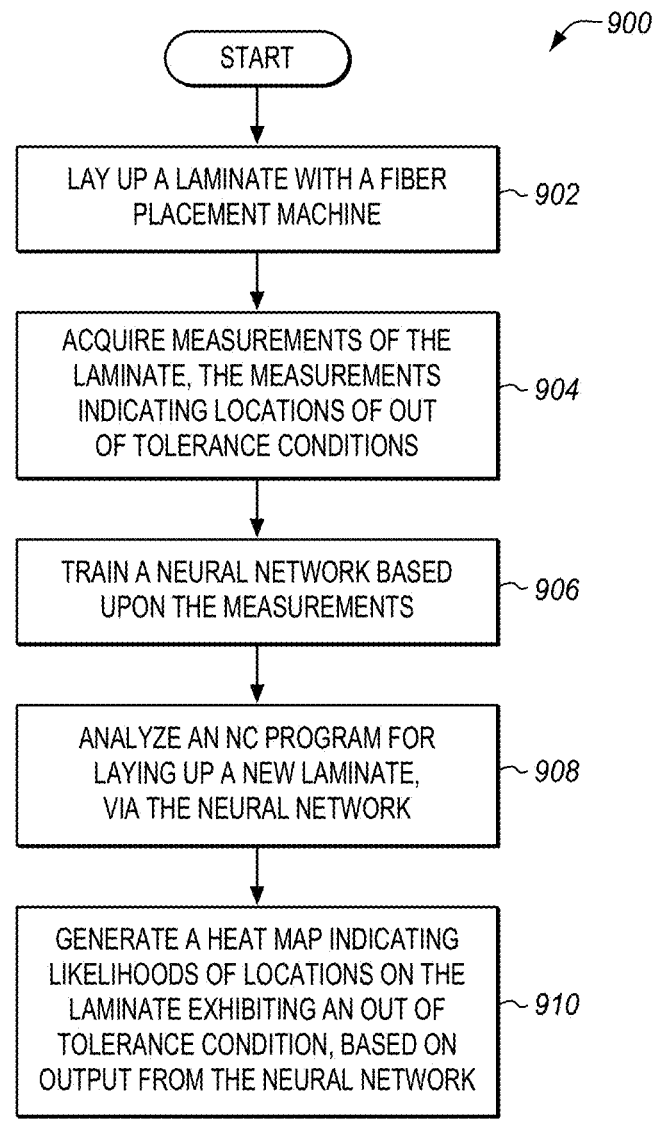
FIG. 9 is a flowchart illustrating a method for making predictions for NC programs used by a fabrication environment in an illustrative embodiment.

FIG. 9 is a flowchart illustrating a method 900 for making predictions for NC programs used by a fabrication environment in an illustrative embodiment. In step 902, method 900 comprises laying up a laminate with a fiber placement machine. Step 904 includes acquiring measurements of the laminate, the measurements indicating locations of out of tolerance conditions. Step 906 includes training a neural network based upon the measurements, and step 908 includes analyzing an NC program for laying up a new laminate, via the neural network. Step 910 includes generating a heat map indicating likelihoods of locations on the laminate exhibiting an out of tolerance condition, based upon output from the neural network.

EXAMPLES

In the following examples, additional processes, systems, and methods are described in the context of fabrication environment that predictively analyzes NC programs to identify likelihoods of fabrication discrepancies.

Figure 10:
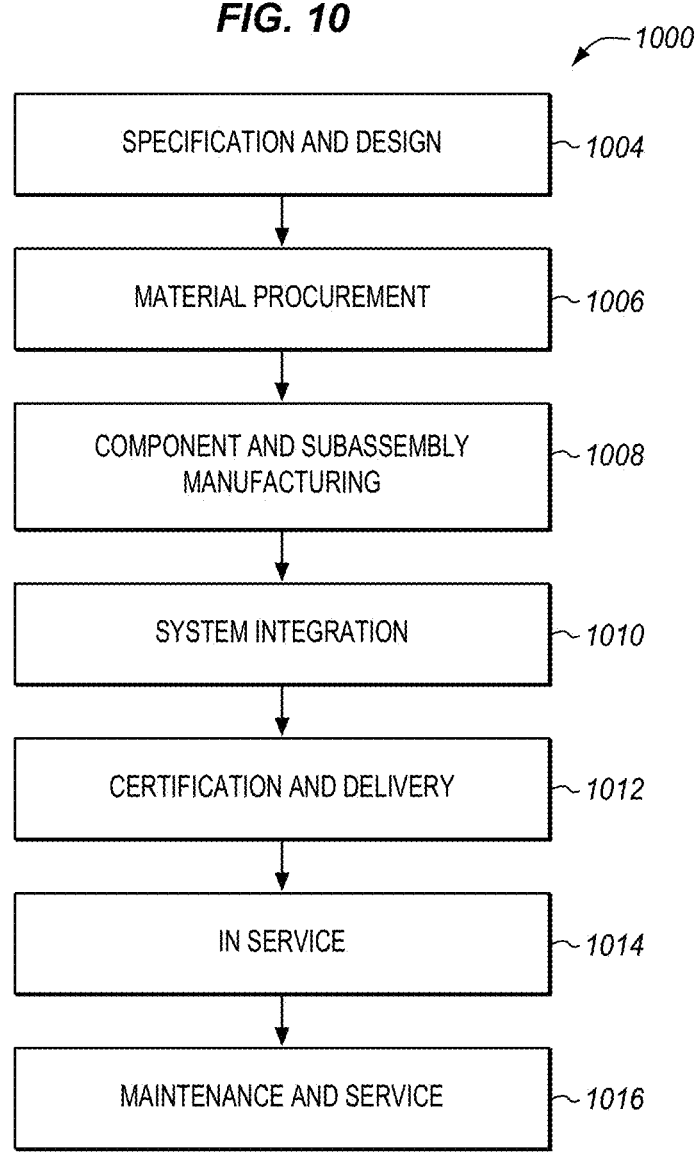
FIG. 10 is a flow diagram of aircraft production and service methodology in an illustrative embodiment.
Figure 11:
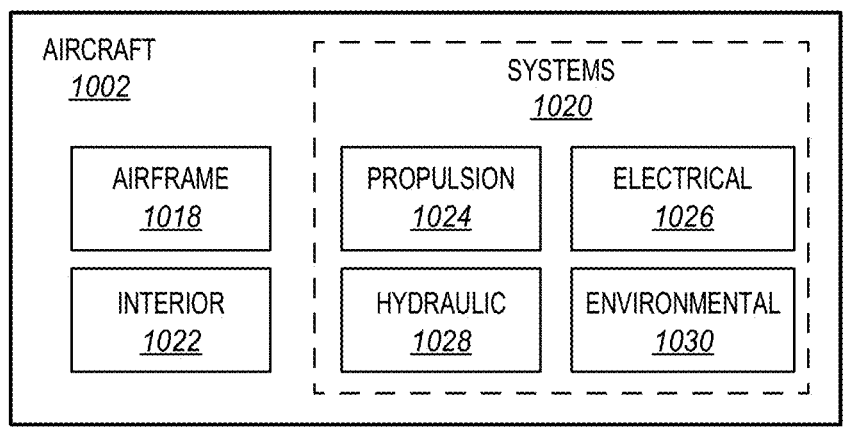
FIG. 11 is a block diagram of an aircraft in an illustrative embodiment.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental system 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. For example, the techniques and systems described herein may be used for material procurement 1006, component and subassembly manufacturing 1008, system integration 1010, service 1014, and/or maintenance and service 1016, and/or may be used for airframe 1018 and/or interior 1022. These techniques and systems may even be utilized for systems 1020, including, for example, propulsion system 1024, electrical system 1026, hydraulic system 1028, and/or environmental system 1030.

In one embodiment, a part comprises a portion of airframe 1018, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to evaluate new NC programs that could be used to fabricate the parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for facilitating fabrication of a composite part, the method comprising:
    loading a Numerical Control (NC) program that directs layup of tows by a fiber placement machine to create a laminate for curing into a composite part;
    extracting tow information recited in the NC program;
    applying inputs based on the tow information to a neural network that has been trained with tow information extracted from prior NC programs, and measurements describing out-of-tolerance discrepancies for other laminates that have been laid-up according to the prior NC programs; and
    reporting likelihood of a fabrication discrepancy that is out of tolerance, based on an output of the neural network for the NC program.

2. The method of claim 1 further comprising:
    subdividing the laminate into multiple locations, wherein:

reporting likelihood of a fabrication discrepancy that is out of tolerance is performed for each of the multiple locations at the laminate.

3. The method of claim 2 wherein:
reporting comprises providing a heatmap visually depicting the laminate, wherein a likelihood of a fabrication discrepancy that is out of tolerance at each of the multiple locations is reported as a color on the heatmap.

4. The method of claim 1 wherein:
the inputs are selected from the group consisting of:
curvature of the laminate at a location, tow length, distance from current location to an end of a tow, a number of layers at a location, a fiber angle within a tow, a temperature of a heater disposed at the fiber placement machine at a location, placement of tows within a course relative to each other, and placement of courses within a layer.

5. The method of claim 1 further comprising:
generating a binary image for each course having a row for each lane at the fiber placement machine.

6. A portion of an aircraft assembled according to the method of claim 1.

7. A non-transitory computer readable medium embodying programmed instructions which, when executed by a processor, are operable for performing a method for facilitating fabrication of a composite part, the method comprising:
loading a Numerical Control (NC) program that directs layup of tows by a fiber placement machine to create a laminate for curing into a composite part;
extracting tow information recited in the NC program;
applying inputs based on the tow information to a neural network that has been trained with tow information extracted from prior NC programs, and measurements describing out-of-tolerance discrepancies for other laminates that have been laid-up according to the prior NC programs; and
reporting likelihood of a fabrication discrepancy that is out of tolerance, based on an output of the neural network for the NC program.

8. The medium of claim 7 wherein the method further comprises:
subdividing the laminate into multiple locations, wherein:
reporting likelihood of a fabrication discrepancy that is out of tolerance is performed for each of the multiple locations at the laminate.

9. The medium of claim 8 wherein:
reporting comprises providing a heatmap visually depicting the laminate, wherein a likelihood of a fabrication discrepancy that is out of tolerance at each of the multiple locations is reported as a color on the heatmap.

10. The medium of claim 7 wherein: fabrication discrepancies are selected from the group consisting of: gaps between tows greater than a first predetermined size, gaps between courses greater than a second predetermined size, laps across tows greater than a third predetermined size, laps across courses greater than a fourth predetermined size, delays in fabrication speed, wrinkles in tows, twists in tows, untacked tows, and a fill ratio below a predetermined amount.

11. The medium of claim 7 wherein the method further comprises:
revising the NC program; and
repeating the steps of extracting, applying, and reporting.

12. A portion of an aircraft assembled according to the method defined by the instructions stored on the computer readable medium of claim 7.

13. An apparatus for facilitating fabrication of a composite part, the apparatus comprising:
a memory storing a Numerical Control (NC) program that directs layup of tows by a fiber placement machine to create a laminate for curing into a composite part; and
a controller that identifies tow information recited in the NC program, applies inputs based on the tow information to a neural network that has been trained with tow information extracted from prior NC programs, and measurements describing out-of-tolerance fabrication discrepancies within other laminates that have been laid-up according to the prior NC programs, and reports a likelihood of a fabrication discrepancy that is out of tolerance, based on an output of the neural network for the NC program.

14. The apparatus of claim 13 wherein:
the controller subdivides the laminate into multiple locations, and reports a likelihood of a fabrication discrepancy that is out of tolerance for each of the multiple locations.

15. The apparatus of claim 13 wherein:
the inputs are selected from the group consisting of:
curvature of the laminate at a location, tow length, distance from current location to an end of a tow, a number of layers at a location, a fiber angle within a tow, a temperature of a heater disposed at the fiber placement machine at a location, placement of tows within a course relative to each other, and placement of courses within a layer.

16. The apparatus of claim 13 further comprising:
a sensor that acquires the measurements.

17. Fabricating a portion of an aircraft using the apparatus of claim 13.

18. A method for facilitating fabrication of a composite part, comprising:
laying up a laminate with a fiber placement machine according to a first Numerical Control (NC) program;
acquiring measurements of the laminate, the measurements indicating locations of out of tolerance conditions:
training a neural network based upon tow information extracted from the first NC program and the measurements;
analyzing a second NC program for laying up a new laminate, via the neural network; and
generating a heat map indicating likelihoods of locations on the new laminate exhibiting an out of tolerance condition, based on output from the neural network.

19. The method of claim 18 further comprising:
training the neural network comprises adjusting weights between nodes in the neural network based on the measurements.

20. The method of claim 18 wherein:
laying up the laminate comprises applying tows of fiber reinforced material.

21. The method of claim 18 wherein: the heat map has a shape corresponding with a shape of the new laminate.

22. A portion of an aircraft assembled according to the method of claim 18.

23. A method for facilitating fabrication of a composite part, the method comprising:
acquiring definitions that characterize out of tolerance conditions for a laminate;
training a neural network based upon the definitions using tow information extracted from a first Numerical Control (NC) program, and measurements describing outof-tolerance fabrication discrepancies within other laminates that have been laid-up according to the first NC program;

operating the neural network to identify a first set of expected locations of out of tolerance conditions for a new laminate defined by a second NC program;

altering the definitions;

re-training the neural network based upon the altered definitions;

operating the re-trained neural network to identify a second set of expected locations of out of tolerance conditions for the new laminate; and generating a report that compares the first set of expected locations to the second set of expected locations.

24. The method of claim 22 wherein:

the definitions indicate a size and shape of out of tolerance conditions.

25. A portion of an aircraft assembled according to the method of claim 22.

* * * * *